United States Patent
Ura et al.

(10) Patent No.: US 6,971,502 B2
(45) Date of Patent: Dec. 6, 2005

(54) METHOD OF CONVEYING EXTRUSION MOLDED PRODUCTS AND DEVICE FOR USE IN THE METHOD

(75) Inventors: Kazuhiko Ura, Tokyo (JP); Yoshitaka Hirao, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 0 days.

(21) Appl. No.: 10/501,590

(22) PCT Filed: Jan. 28, 2003

(86) PCT No.: PCT/JP03/00771

§ 371 (c)(1),
(2), (4) Date: Dec. 8, 2004

(87) PCT Pub. No.: WO03/064300

PCT Pub. Date: Aug. 7, 2003

(65) Prior Publication Data

US 2005/0085944 A1    Apr. 21, 2005

(30) Foreign Application Priority Data

Jan. 28, 2002 (JP) .............................. 2002-018405

(51) Int. Cl.[7] .............................................. B65G 43/00
(52) U.S. Cl. .............................. 198/460.2; 198/347.1; 198/594
(58) Field of Search ............................ 198/347.1, 588, 198/594, 812, 460.2

(56) References Cited

U.S. PATENT DOCUMENTS

| | | | | |
|---|---|---|---|---|
| 2,932,376 A | * | 4/1960 | Millington | 198/594 |
| 4,413,724 A | * | 11/1983 | Fellner | 198/594 |
| 5,191,965 A | * | 3/1993 | Scheid | 198/460.2 |
| 5,611,418 A | * | 3/1997 | Helmstetter | 198/347.1 |
| 5,680,746 A | * | 10/1997 | Hornisch | 198/345.2 |
| 5,960,927 A | * | 10/1999 | Bahr | 198/347.1 |

* cited by examiner

Primary Examiner—James R. Bidwell
(74) Attorney, Agent, or Firm—Oliff & Berridge, PLC

(57) ABSTRACT

A conveyor system having an expansion conveyor interposed between some of a plurality of conveyors of a conveying unit to extend the conveying line when trouble is detected at a receiving unit. Upon detection of trouble the extruder revolution speed and the conveyor speed are changed to reduce the conveying speed not to carry molded products to the receiving unit.

6 Claims, 4 Drawing Sheets

FIG.3

EXTRUDER SPEED TALBE

| CV SPEED (m/min) | EXTRUDER #1(rpm) | EXTRUDER #2(rpm) |
|---|---|---|
| 0.5 | 23 | 15 |
| 0.6 | 26 | 17 |
| ⋮ | ⋮ | ⋮ |
| ⋮ | ⋮ | ⋮ |
| ⋮ | ⋮ | ⋮ |
| ⋮ | ⋮ | ⋮ |
| 20.0 | 1000 | 950 |

FIG.4

SIZE RECIPE

| | | PARAMETER | |
|---|---|---|---|
| AT THE TIME OF INCREASING SPEED | RESPONSE DELAY OF EXTRUDER SPEED | 35 | (0.1%) |
| | ATTENUATION TIME | 33 | (sec.) |
| AT THE TIME OF REDUCING SPEED | RESPONSE DELAY OF EXTRUDER SPEED | 20 | (0.1%) |
| | ATTENUATION TIME | 15 | (sec.) |

METHOD OF CONVEYING EXTRUSION MOLDED PRODUCTS AND DEVICE FOR USE IN THE METHOD

BACKGROUND OF THE INVENTION

1. Field of the Invention

The present invention relates to a method of conveying extrusion molded products which are continuously extruded, such as tire treads, and to a device for use in the method.

2. Description of the Prior Art

In an extruding/conveying line of the prior art, the above treads are delivered from an extruder at an extrusion speed which is determined according to the size of the extruded treads and carried to a receiving unit at the same speed as the above delivery speed by a plurality of conveyors.

However, since the conveying speed is fixed in the above prior art method, when a trouble occurs in the receiving unit, for example, the extruding/conveying line must be suspended and also work for processing after suspension before the resumption of extrusion takes a long time. Further, a trouble occurs in the end portion of an extrusion molded product during the time from the resumption of extrusion to the production of a quality product.

When a tread is removed before the receiving unit or when a tread is carried to a place other than the receiving unit, a quality product cannot be received by a predetermined method, whereby it is regarded as an inferior product.

It is an object of the present invention which has been made in view of the above problem to provide a method of conveying extrusion molded products, which prevents extrusion molded products from being carried to a receiving unit without suspending a conveying line for a predetermined time even when a trouble occurs in the receiving unit as well as a device for use in the method.

SUMMARY OF THE INVENTION

According to a first aspect of the present invention, there is provided a method of conveying extrusion molded products from a material feed unit to a receiving unit by a plurality of conveyors, comprising interposing at least one expansion conveyor between conveyors out of the conveyors to expand or contract the expansion conveyor in order to adjust the conveying speed of the extrusion molded products. Thereby, even when a trouble occurs in the receiving unit, the above expansion conveyor is expanded to extend the conveying line so as to buffer the above extrusion molded products while they are carried. Therefore, the extrusion molded products are not carried to the receiving unit without suspending the conveying line for a predetermined time. After the trouble is solved, the above expansion conveyor is contracted to shorten the conveying line and the extrusion molded products in stock can be carried to the receiving unit swiftly. Therefore, productivity can be improved.

According to a second aspect of the present invention, there is provided a method of conveying extrusion molded products, wherein the conveyor speed of the conveyors can be changed to several levels. Thereby, when the above trouble occurs, the conveying speed is reduced to extend the time elapsed before the buffer becomes full and after the trouble is solved, the conveying speed is increased to return the conveying line to normal operation swiftly.

According to a third aspect of the present invention, there is provided a method of conveying extrusion molded products, wherein the delivery speed of the material feed unit is controlled according to a change in the conveyor speed of the conveyors. Thereby, the extrusion molded products can be carried smoothly.

According to a fourth aspect of the present invention, there is provided a method of conveying extrusion molded products, wherein when the material feed unit has a plurality of extruders, the speed of each extruder is controlled according to a change in the conveyor speed of the conveyors.

According to a fifth aspect of the present invention, there is provided a method of conveying extrusion molded products, wherein a response delay of the delivery speed of the material feed unit to the conveyor speed of the conveyors and the attenuation time are obtained in advance and when the conveyor speed of the conveyors is changed, the target value of the delivery speed is set based on the response delay and the attenuation time.

According to a sixth aspect of the present invention, there is provided a method of conveying extrusion molded products, wherein the target value of conveying speed is set according to the throughput of the receiving unit.

According to a seventh aspect of the present invention, there is provided a device for conveying extrusion molded products, having a plurality of conveyors to carry extrusion molded products from a material feed unit to a receiving unit, wherein at least one expansion conveyor is interposed between conveyors out of the plurality of conveyors.

BRIEF DESCRIPTION OF THE DRAWINGS

FIG. 3 is a diagram showing a speed table for conveyors and extruders;

FIG. 4 is a diagram showing a response delay of the delivery speed of a tread extruder to the conveying speed of the conveyors and attenuation time.

DETAILED DESCRIPTION OF THE PREFERRED EMBODIMENT

A preferred embodiment of the present invention will be described hereinbelow with reference to the drawings.

Figure 1:
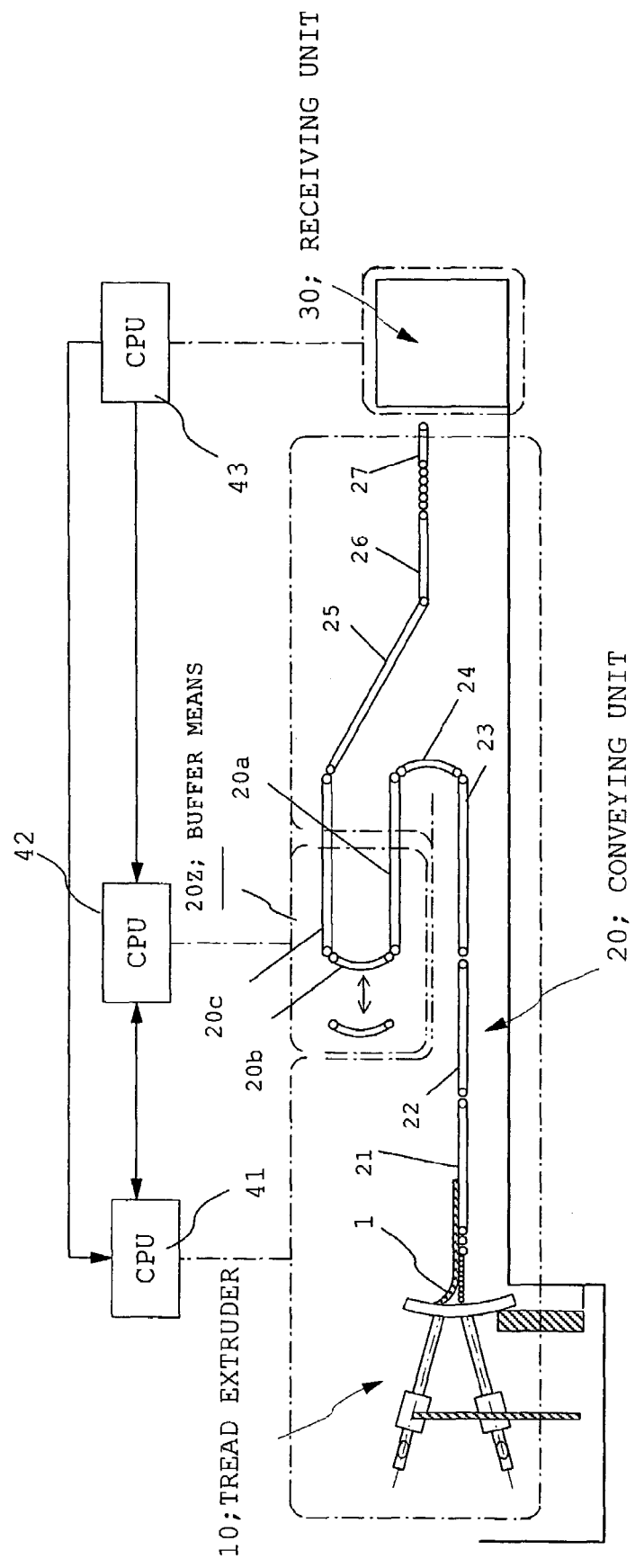
FIG. 1 is a schematic diagram showing the constitution of a device for carrying extrusion molded products according to a preferred embodiment of the present invention.

FIG. 1 is a schematic diagram showing the constitution of a device for conveying extrusion molded products according to the present invention. In FIG. 1, reference numeral 10 denotes a tread extruder (to be referred to as "extruder" hereinafter) which is a material feed unit for delivering extrusion molded products at a predetermined delivery speed, 20 a conveying unit for carrying belt-like extruded treads 1 delivered from the extruder 10, which comprises a plurality of conveyors 21 to 27 and buffer means 20Z interposed between an inverted conveyor 24 and an inclined conveyor 25 and consisting of an expansion conveyor 20a, inverted conveyor 20b and expansion conveyor 20c, and 30 a receiving unit for receiving the carried extruded treads 1, which is located on a downstream side of the last conveyor 27 of the above conveying unit 20.

Reference numeral 41 denotes a speed control CPU for controlling an extruder revolution R corresponding to the delivery speed of the extruder 10 and the conveyor speed V of the conveyors 21 to 27, 20a, 20b and 20c, 42 an expansion control CPU for expanding and contracting the expansion conveyors 20a and 20c of the buffer means 20Z and moving the position of the inverted conveyor 20b according to the expansion or contraction of the above expansion conveyors 20a and 20c, and 43 a reception control CPU for monitoring and controlling the tread receiving and processing states of the receiving unit 30.

Figure 2:
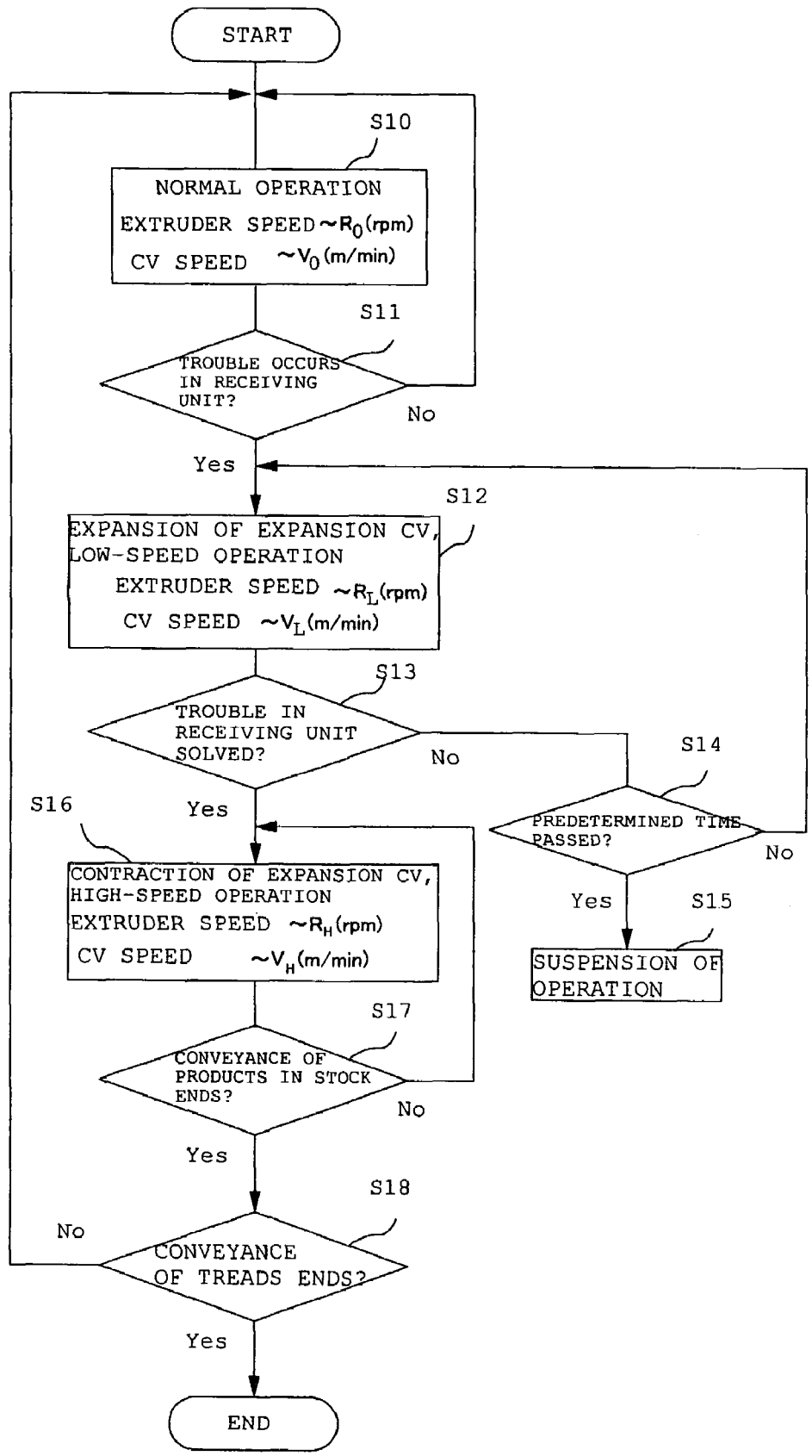
FIG. 2 is a flow chart showing a method of carrying extrusion molded products according to the preferred embodiment of the present invention.

A description is subsequently given of the operation of the device for conveying extrusion molded products of the present invention with reference to the flow chart of FIG. 2.

In step S10, the belt-like extruded treads 1 are delivered from the extruder 10 to the conveying unit 20 at a predetermined extruder speed (extruder revolution) $R_0$ and carried to the receiving unit 30 at a conveyor speed $V_0$ corresponding to the above extruder revolution $R_0$. The control of the above extruder revolution $R_0$ and the conveyor speed $V_0$ is carried out by the speed control CPU 41.

The reception control CPU 43 monitors whether there is a trouble in the tread receiving and processing states of the receiving unit 30 (step S11). When there is no trouble, the above normal operation is continued. When a trouble occurs in the receiving unit 30, the above trouble information is sent to the expansion control CPU 42 and the speed control CPU 41 from the above reception control CPU 43 to enable the expansion control CPU 42 to expand the expansion conveyors 20a and 20c of the buffer means 20Z and move the inverted conveyor 20b in accordance with the expansion of the above expansion conveyors 20a and 20b so as to extend the conveying line and to enable the speed control CPU 41 to change the extruder revolution R and the speed V of the conveyors 21–27, 20a, 20b and 20c of the conveying unit 20 to $R_L$ (<$R_0$) and $V_L$ (<$V_0$), respectively, so as to reduce the conveying speed, thereby buffering the extruded treads 1 not to carry them to the receiving unit 30 (step S12).

FIG. 3 is a speed table showing the extruder speed (extruder revolution) R and the conveyor speed V controlled by the speed control CPU 41. In this embodiment, the conveyor speed V is set to several levels (the conveyor speed V is set to a range of 0.5 to 20 m/min in increments of 0.1 m/min) and the delivery speed of the extruder 10 is controlled according to a change in the conveyor speed V of the above conveyors. When there are a plurality of extruders 10 (extruder #1 and extruder #2 in this embodiment), the revolution R of each extruder is changed according to the above conveyor speed V.

Figure 5:
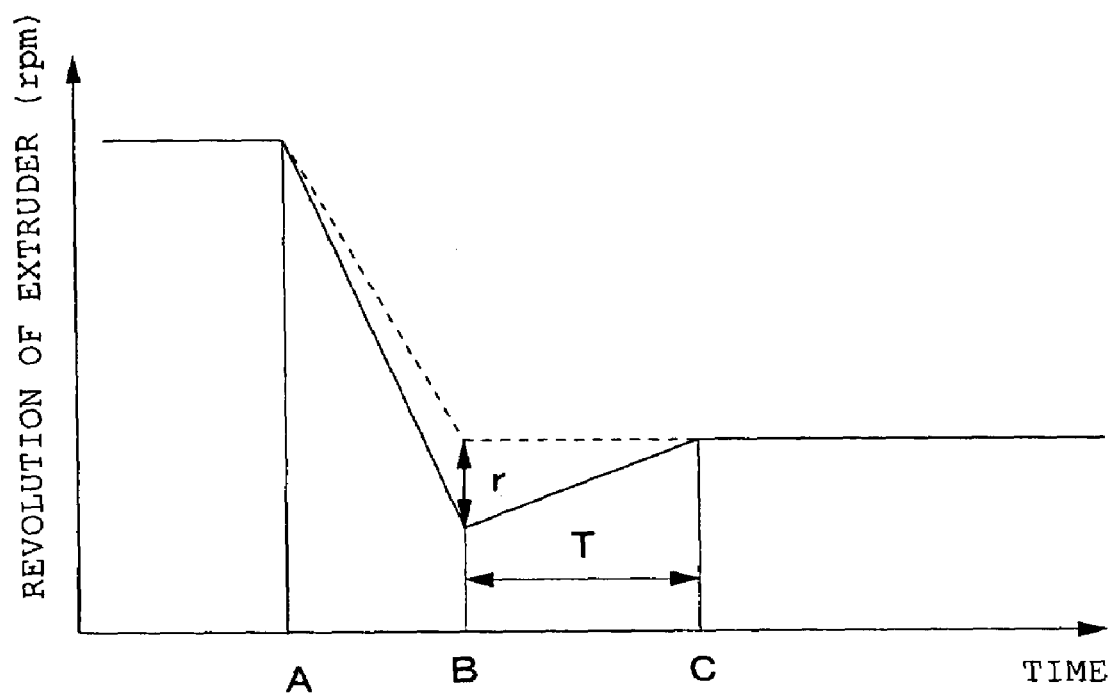
FIG. 5 is a diagram showing a control example of the delivery speed of the extruder.

When the speed of the extruder 10 (extruder revolution R) is changed according to the above conveyor speed, the amount of extrusion becomes insufficient. Therefore, as shown in FIG. 4, a response delay of the delivery speed of the extruder 10 to the conveyor speed of the conveyors and the attenuation time are obtained in advance and the target value of the above delivery speed is set based on the above response delay and the attenuation time when the conveyor speed of the conveyors is changed. Stated more specifically, as shown in FIG. 5, the target value of delivery speed of the extruder 10 is set to a value obtained by adding the response delay "r" to the above conveyor speed. How fast (in seconds) the delivery speed of the extruder 10 is reduced to a target value is determined by the attenuation time "T" as a parameter for each extruder 10. Thereby, even when the speed is variable, predetermined quality products can be obtained.

The conveyor speed $V_L$ and the extruder revolution $R_L$ which are changed to reduce the delivery speed may be determined according to the trouble information sent from the reception control CPU 43 to the speed control CPU 41 or may be reduced stepwise every a predetermined time.

Thereby, when a trouble occurs in the receiving unit 30, it can be solved without carrying the extruded treads 1 to the receiving unit 30 until the above buffer means 20 becomes full, thereby making it possible to avoid the manufacture of inferior products.

During the above low-speed operation, the reception control CPU 43 monitors whether the trouble in the receiving unit 30 is solved or not (steps S13 and S14). When the trouble is not solved, low-speed operation is continued. If the trouble is not solved within a predetermined time during which buffering is possible, the delivery of the extruded treads 1 is suspended (step S15).

When the trouble is solved, the routine proceeds to step S16 where information on the solution of the trouble is sent to the expansion control CPU 42 and the speed control CPU 41 from the reception control CPU 43 so that the expansion control CPU 43 can contract the expansion conveyors 20a and 20c of the buffer means 20Z to the full, thereby minimizing the length of the conveying line and that the speed control CPU 41 changes the extruder revolution R and the conveyor speed V of the conveyors 21–27, 20a, 20b and 20c of the conveying unit 20 to $R_H$ (>$R_0$) and $V_H$ (>$V_0$), respectively, to increase the conveying speed and carry the buffered extruded treads 1 to the receiving unit 30.

To shift to the high-speed operation, like the above low-speed operation, a response delay of the delivery speed of the extruder 10 to the conveyor speed of the conveyor belts and the attenuation time are obtained in advance, and the target value of delivery speed of the extruder 10 is set based on the response delay of the extruder 10 and the attenuation time.

The above high-speed operation is continued until the conveyance of the extruded treads 1 in stock ends (step S17) and then changed to normal operation, and the operation of the device is suspended when the conveyance of the extruded treads 1 ends (step S18).

Thereby, after return from a trouble, products in stock can be carried swiftly and the conveying line can be returned to normal operation swiftly.

According to this embodiment, since the buffer means 20Z consisting of the expansion conveyor 20a, inverted conveyor 20b and expansion conveyor 20c is interposed between the conveyors 24 and 25 of the conveying unit 20, when a trouble occurs in the receiving unit 30, the expansion conveyors 20a and 20c of the buffer means 20Z are expanded by the expansion control CPU 42 to extend the conveying line, and the extruder revolution R and the conveyor speed V are changed by the speed control CPU 41 to reduce the conveying speed in order to buffer the extruded treads 1 not to carry them to the receiving unit 30. Therefore, the trouble can be solved without carrying the extruded treads 1 to the receiving unit 30 until the above buffer means 20Z becomes full, and the manufacture of inferior products can be avoided, thereby making it possible to improve production efficiency.

When the above trouble is solved, the conveying line of the buffer means 20Z is made the shortest and the extruder revolution R and the conveyor speed V are changed to increase the conveying speed and the buffered extruded treads 1 are carried to the receiving unit 30, thereby making it possible to carry the extruded treads 1 in stock swiftly. Therefore, the conveying line can be returned to normal operation swiftly.

In the above embodiment, the method of conveying the extruded treads 1 has been described. The present invention is not limited to the above method and may be applied to a method of conveying general extrusion molded products which are continuously delivered from the material feed unit.

The position of the buffer means 20Z is not limited to the position shown in FIG. 1 and may be between any conveyors out of the conveyors 21 to 27, and the buffer means 20Z may have at least one expansion conveyor.

The speed table showing the extruder revolution R and the conveyor speed V of FIG. 3 may be suitably set according to the actual situation of the conveying line.

INDUSTRIAL FEASIBILITY

As described above, according to the present invention, at least one expansion conveyor is interposed between conveyors in the conveying line of extrusion molded products to be expanded or contracted in order to adjust the conveying speed of the extrusion molded products. Therefore, even when a trouble occurs in the receiving unit, the conveying line is extended by expanding the above expansion conveyor to buffer the above extrusion molded products while they are carried. Therefore, it is possible not to carry the extruded products to the receiving unit without suspending the conveying line for a predetermined time. After the trouble is solved, the conveying line is shortened by contracting the above expansion conveyor to carry the extrusion molded products in stock to the receiving unit, thereby making it possible to avoid the manufacture of inferior products and to resume carrying the molded products to the receiving unit swiftly. Consequently, productivity can be greatly improved.

Since the conveyor speed of the above conveyors can be changed to several levels, the conveying speed can be reduced when the trouble occurs, thereby making it possible to extend the time elapsed before the buffer becomes full, and the conveying speed can be increased when the trouble is solved, thereby making it possible to return the conveying line to a normal state swiftly.

What is claimed is:

1. A method of conveying extrusion molded products from a material feed unit to a receiving unit by a plurality of conveyors, comprising:
    removably interposing at least one expansion conveyor between some of the plurality of the conveyors causing expansion or contraction thereby adjusting a conveying speed of the extrusion molded products to be carried, wherein
        a conveyor speed of the plurality of conveyors can be changed to several levels,
        a delivery speed of the material feed unit is controllable to be increased or decreased depending on an increase or decrease of the conveyor speed of the plurality of conveyors, and
        obtaining in advance a response delay of the delivery speed of the material feed unit to the conveyor speed of the plurality of conveyors and an attenuation time, wherein a target value of the delivery speed is set based on the response delay and the attenuation time when the conveyor speed of the plurality of conveyors is changed.

2. The method of conveying extrusion molded products according to claim 1, wherein when the material feed unit has a plurality of extruders, the speed of each extruder is controlled according to a change in the conveyor speed of the conveyors.

3. The method of conveying extrusion molded products according to claim 1, wherein the target value of conveying speed is set according to the throughput of the receiving unit.

4. A device for conveying extrusion molded products from a material feed unit to a receiving unit, having a plurality of conveyors and at least one expansion conveyor removably interposed between some of the plurality of conveyors, comprising:
    means for changing a conveyor speed of the conveyors to several levels;
    means for controlling a delivery speed of the material feed unit to increase or decrease depending on an increase or decrease of the conveyor speed of the conveyors;
    means for setting a target value of the delivery speed of the extrusion molded products based on a previously obtained conveyor speed of the conveyors, a response delay of the delivery speed of the material feed unit, and an attenuation time, at a time when the conveyor speed of the conveyors is changed, the target value of the delivery speed is set to the target value having been set.

5. The method of conveying extrusion molded products according to claim 2, wherein the target value of conveying speed is set according to the throughput of the receiving unit.

6. The method of conveying extrusion molded products according to claim 1, wherein the target value of conveying speed is set according to the throughput of the receiving unit.

* * * * *